UNITED STATES PATENT OFFICE.

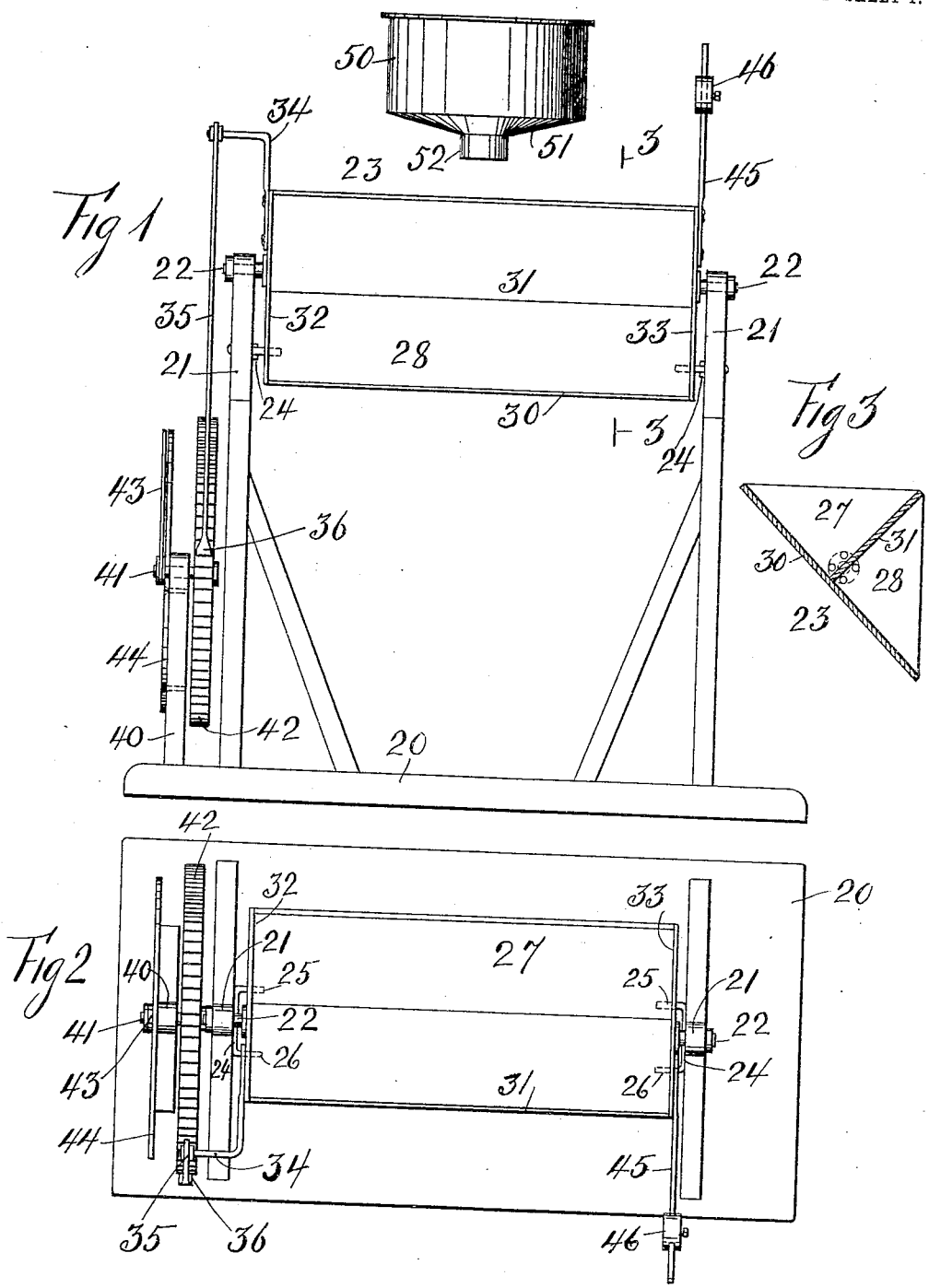

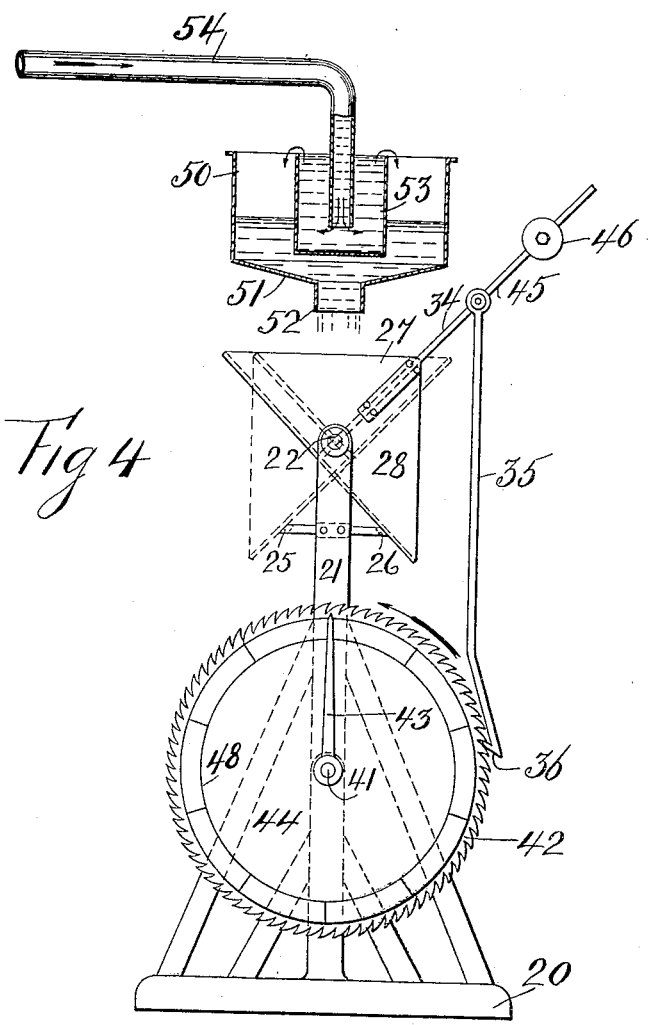

ANTONIO DEL CASTILLO Y ROMERO, OF CIENFUEGOS, CUBA.

HOPPER-MEASURING MACHINE.

932,754.

Specification of Letters Patent.

Patented Aug. 31, 1909.

Application filed December 19, 1907. Serial No. 407,126.

*To all whom it may concern:*

Be it known that I, ANTONIO DEL CASTILLO Y ROMERO, a subject of Spain, and resident of Cienfuegos, in the Province of Santa Clara, Republic of Cuba, have invented certain new and useful Improvements in Hopper-Measuring Machines, of which the following is a specification.

This invention relates to hopper measuring machines. Its object is the production of a hopper measuring machine which is specially useful for weighing fluids and liquids, but which can be adapted to weighing other materials, without departing from the spirit of the invention.

The organization of the invention comprises essentially a tipping hopper to receive and measure the fluid, and an indicator to indicate the number of tippings of the hopper.

In the drawings Figure 1 represents a front elevation of the invention, Fig. 2 shows a partial top plan view of Fig. 1, Fig. 3 is a section of Fig. 1 on the line 3, 3, and Fig. 4 shows a left hand side view of Fig 1.

The machine is represented to comprise a frame 20 with the posts 21, which latter carry the trunnions 22 that extend from the tipping hopper 23. To the posts 21 are fastened stops 24 with the prongs 25, 26.

The hopper 23 is composed of two equal compartments 27, 28, which are in the form of triangular prisms, and consists of the bottom 30, dividing wall 31 and ends 32, 33. To the end 32 is fastened a journal rod 34, on the outer end of which is fulcrumed the pawl rod 35 with the hook end 36.

From the frame 20 extends a post 40 in which is journaled a journal pin 41, at one end of which latter is fastened a ratchet wheel 42, the teeth of which engage with the hook end 36 of the pawl rod 35, and at the other end of the pin 41 is fastened a pointer 43. To the post 40 is fastened a dial plate 44 with a scale 48 as shown. To the end 33 of the hopper is fastened a rod 45 on which is adjustably clamped a counterweight 46.

Above the measuring hopper 23 is located an equalizing receiving receptacle having the cylindrical body portion 50, with the bottom 51 in the form of a truncated cone, the latter having the outlet 52. On the inside of the body portion 50 is located the cylindrical equalizing tank 53 into which is located the inlet pipe 54.

To use the invention a fluid is conducted through the pipe 54 into the equalizing tank 53, and any fluctuations of velocity of discharge from said pipe on account of fluctuations of the head of the fluid therein, will be materially reduced and equalized, on account of the diameter of the discharge of the tank 53, which latter is much larger than the diameter of the pipe 54. The fluid overflows from the tank 53 and enters the equalizing receptacle with the body portion 50, from which latter it is discharged through the outlet 52 and enters the tipping hopper. A second equalization takes place in the equalizing receptacle. The maximum fluctuation of velocity in the said receptacle depends upon the height of the fluid therein, which is confined by the height of said receptacle and is independent of the velocity of discharge from the pipe 54. The tipping hopper can be supposed to be located as shown in the full lines in Fig. 4, the bottom thereof bearing on the prongs 26, with the center of gravity of the hopper to the right of the axial line of the trunnions 22. The liquid on leaving the outlet 52 will be poured into the compartment 27. The weight of said liquid in said compartment will move the center of gravity thereof to the left of the axial line of the trunnions 22, and in so doing said hopper is tipped to the left as shown in dotted lines in said Fig. 4, the bottom of the hopper then bearing on the prongs 25, and the contents of the compartment 27 will flow therefrom into a receptacle not shown. When the hopper is tipped, the pawl rod 35 will be pulled up to the left, and the hook end 36 engaging the teeth of the ratchet wheel 42, will turn the latter for a portion of a revolution and with it the pointer 43, which will be indicated on the scale 48. After the tipping hopper 23 has been tipped to the left, the discharge from the outlet 52 will immediately flow into the other compartment 28 thereof, and as soon as the weight of the material in the latter compartment moves the center of gravity to the right of the axial line of the trunnions 22, the tipping hopper will be tipped to the right to its original position, and the contents of the compartment 28 will flow therefrom to the receptacle not shown, and at the same time the hook end 36 of the pawl rod 35 will slide over the teeth of the ratchet wheel 42. Thus each time the tipping hopper is tipped forward and back the dial plate 44 is moved one of the divisions shown on the scale 48. The counterweight 46 on the rod 45, can be adjusted on said rod to suit fluids of different specific gravities.

Having described my invention I claim:

1. In a hopper measuring machine the combination of a pair of posts, trunnions journaled in the posts, a tipping hopper with a wall dividing the same into a pair of equal compartments connected with the trunnions, a stop with a pair of prongs extending from each post for the hopper to bear against, a third post in the machine, a journal journaled in the latter post, a ratchet wheel fastened on the said journal pin, a journal rod extending from one end of the hopper, a pawl rod fulcrumed to the journal rod, a hook end on the pawl rod engaging with the ratchet wheel, a dial plate connected with the latter post, a pointer fastened to the journal pin for the dial plate, and means to pour a fluid into the compartments of the tipping hopper.

2. In a hopper measuring machine the combination of a pair of posts, trunnions journaled in the posts, a tipping hopper with a pair of equal compartments connected with the trunnions, a stop with a pair of prongs extending from each post located so that the hopper can bear alternately on a prong of each pair, a third post in the machine, a journal pin journaled to the latter post, a ratchet wheel fastened on the said journal pin, a journal rod extending from one end of the hopper, a pawl rod fulcrumed to the journal rod, a hook end on the pawl rod engaging with the ratchet wheel, a dial plate connected with the latter post, a scale on the dial plate, a pointer fastened to the journal pin for the dial plate, a rod extending from one end of the hopper, a counterweight adjustably connected to the latter rod, and means to pour a fluid into the compartments of the tipping hopper.

3. In a hopper measuring machine the combination of a tipping hopper having a pair of compartments, a recording device connected with said hopper, an equalizing receiving receptacle over the tipping hopper having an outlet, an equalizing tank in the receiving receptacle, and a pipe for the fluid to be measured leading into said tank.

4. In a hopper measuring machine the combination of a tipping hopper having a pair of equal compartments, a recording device connected with said hopper, an equalizing cylindrical receptacle with a conical truncated bottom and an outlet in the latter located so as to alternately lead a fluid into the compartments of the tipping hopper, a cylindrical equalizing tank in the receptacle, and a pipe leading into said tank, so that a fluid will overflow therefrom into the said receptacle.

5. In a hopper measuring machine the combination of a tipping hopper having a pair of compartments, a recording device connected with said hopper, an equalizing receiving receptacle with an outlet located to alternately lead a fluid into the compartments of the tipping hopper, an equalizing tank in the receptacle, a pipe leading into said tank to conduct a fluid thereto, and overflow from the same into the equalizing receiving receptacle.

Signed at Cienfuegos, in the Province of Santa Clara, and Republic of Cuba, this 11th day of November A. D., 1907.

ANTONIO DEL CASTILLO Y ROMERO.

Witnesses:
 José Wazousalus,
 B. Carbo.